(12) United States Patent
Zhou et al.

(10) Patent No.: US 12,116,319 B2
(45) Date of Patent: Oct. 15, 2024

(54) ULTRALOW-CARBON CLINKER-FREE CEMENT, METHOD FOR PREPARING SAME AND APPLICATION OF ULTRALOW-CARBON CLINKER-FREE CEMENT

(71) Applicant: HEBEI UNIVERSITY OF TECHNOLOGY, Tianjin (CN)

(72) Inventors: Jian Zhou, Tianjin (CN); Mingfeng Xu, Tianjin (CN)

(73) Assignee: HEBEI UNIVERSITY OF TECHNOLOGY, Tianjin (CN)

( * ) Notice: Subject to any disclaimer, the term of this patent is extended or adjusted under 35 U.S.C. 154(b) by 0 days.

(21) Appl. No.: 18/255,044

(22) PCT Filed: Sep. 16, 2022

(86) PCT No.: PCT/CN2022/119169
§ 371 (c)(1),
(2) Date: May 30, 2023

(87) PCT Pub. No.: WO2023/001320
PCT Pub. Date: Jan. 26, 2023

(65) Prior Publication Data
US 2023/0391673 A1 Dec. 7, 2023

(30) Foreign Application Priority Data

Jan. 17, 2022 (CN) .......................... 202210047686.4
Jun. 24, 2022 (CN) .......................... 202210720479.0

(51) Int. Cl.
| | |
|---|---|
| *C04B 28/14* | (2006.01) |
| *C04B 7/21* | (2006.01) |
| *C04B 12/00* | (2006.01) |
| *C04B 40/00* | (2006.01) |
| C04B 7/153 | (2006.01) |
| C04B 28/08 | (2006.01) |
| C04B 103/12 | (2006.01) |
| C04B 111/10 | (2006.01) |

(52) U.S. Cl.
CPC ............... *C04B 28/14* (2013.01); *C04B 7/21* (2013.01); *C04B 12/00* (2013.01); *C04B 40/0042* (2013.01); C04B 7/1535 (2013.01); C04B 28/08 (2013.01); C04B 2103/12 (2013.01); C04B 2111/1031 (2013.01); C04B 2111/1037 (2013.01); C04B 2111/1087 (2013.01); Y02P 40/10 (2015.11); Y02W 30/91 (2015.05)

(58) Field of Classification Search
CPC . C04B 28/14; C04B 40/0042; C04B 2103/12; C04B 2111/1031; C04B 2111/1087; C04B 12/00; C04B 28/08; C04B 41/5083; C04B 41/5085; C04B 7/21; C04B 7/1535; C04B 2111/1037; C04B 20/026; C04B 12/005; C04B 7/153; C04B 22/143; C04B 22/064; C04B 40/0028; C04B 20/008; C21C 2005/363; Y02P 40/10; Y02W 30/91
See application file for complete search history.

(56) References Cited

FOREIGN PATENT DOCUMENTS

| | | | | |
|---|---|---|---|---|
| CN | 1405108 | A | 3/2003 | |
| CN | 101525217 | A * | 9/2009 | ............ C04B 7/153 |
| CN | 113845317 | A | 12/2021 | |
| CN | 114804684 | A | 7/2022 | |
| JP | 2003321259 | A | 11/2003 | |
| RU | 2430043 | C1 | 9/2011 | |

OTHER PUBLICATIONS

Kazanskaya, L.F.; Smirnova, O.M.; Palomo, Á.; Menendez Pidal, I.; Romana, M. Supersulfated Cement Applied to Produce Lightweight Concrete. Materials 2021, 14, 403. DOI:10.3390/ma14020403 (Year: 2021).*
CN-101525217-A, machine translation (Year: 2009).*
Numerade [retrieved in the internet at Nov. 16, 2023 from <URL:https://www.numerade.com/ask/question/solid-calcium-oxide-reacts-with-liquid-water-to-produce-calcium-hydroxide-write-a-balanced-equation-for-the-reaction-hzo-co-0-h-2-a-0-how-many-of-calcium-bydroxideare-produced-when-8795grams-06978/>] (Year: 2021).*
International Search Report (with English translation) and Written Opinion issued in PCT/CN2022/119169, dated Nov. 29, 2022, 10 pages provided.
Notice of Allowance issued in CN202210720479.0, dated Aug. 23, 2022, with English translation, 3 pages provided.
Office Action issued in CN202210720479.0, dated Aug. 8, 2022, with English translation, 29 pages provided.
European Committee for Standardization, "Supersulfated cement—Composition, specifications and conformity criteria", approved by CEN on Dec. 11, 2009 and includes Amendment 1 approved by CEN on Nov. 24, 2014.

(Continued)

*Primary Examiner* — Anthony J Green
*Assistant Examiner* — Marites A Guino-O Uzzle
(74) *Attorney, Agent, or Firm* — HSML P. C.

(57) ABSTRACT

The disclosure provides an ultralow-carbon clinker-free cement, prepared from the following raw materials: granulated blast-furnace slag, gypsum and calcium oxide-based materials. The granulated blast-furnace slag accounts for 65%-95% of the total weight of the raw materials, the gypsum accounts for 4.5%-34.5% of the total weight of the raw materials, and the balance is the calcium oxide-based material. A weight percentage of calcium oxide and/or calcium hydroxide in the total weight of the raw materials is controlled to be 0.05%-0.75%. The disclosure further provides a method for preparing the ultralow-carbon clinker-free cement and application of the ultralow-carbon clinker-free cement in the preparation of concrete, mortar or cement products. The ultralow-carbon clinker-free cement of the disclosure has the advantages of high early strength, ultra-high long-term strength, low shrinkage, carbonation resistance, low carbon emissions, etc.

18 Claims, 1 Drawing Sheet

(56) References Cited

OTHER PUBLICATIONS

Juenger et al., "Advances in alternative cementitious binders", ELSEVIER, Cement and Concrete Research, vol. 41, Issue 12, Dec. 2011, pp. 1232-1243.

Mebarkia et al., "Study of the effect of cement kiln dust on the mechanical, thermal and durability properties of compressed earth blocks", ELSEVIER, Construction and Building Materials, vol. 349, Sep. 26, 2022, 128707.

Najim et al., "Experimental investigation on using Cement Kiln Dust (CKD) as a cement replacement material in producing modified cement mortar", ELSEVIER, Construction and Building Materials, vol. 55, Mar. 31, 2014, pp. 5-12.

Kunal et al., "Use of cement kiln dust in cement concrete and its leachate characteristics", ELSEVIER, Resources, Conservation and Recycling, vol. 61, Apr. 2012, pp. 59-68.

Hewlett et al., Alkaline Activation: NaOH, KOH, Waterglass, Cements Made From Blastfurnace Slag 475, Lea's Chemistry of Cement and Concrete 5th Edition, Mar. 6, 2019.

* cited by examiner

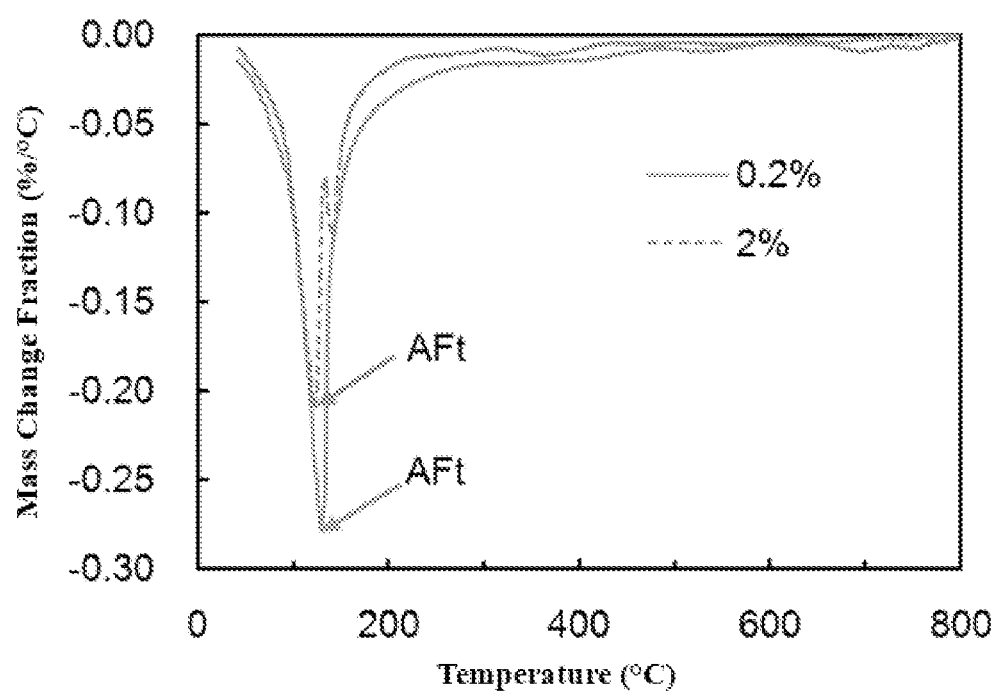

ULTRALOW-CARBON CLINKER-FREE CEMENT, METHOD FOR PREPARING SAME AND APPLICATION OF ULTRALOW-CARBON CLINKER-FREE CEMENT

TECHNICAL FIELD

The disclosure relates to the technical field of building materials, and in particular to an ultralow-carbon clinker-free cement and a method for preparing the same.

BACKGROUND

As an indispensable basic material for the construction of modern society, cement meets the huge demand of infrastructure construction, while its production is accompanied by the problem of high carbon emissions.

Supersulfated cement usually refers to a novel low-carbon cement with granulated blast-furnace slag as the main raw material, gypsum as the sulfate activator and silicate clinker or lime as the alkaline activator. The supersulfated cement has the characteristics of low heat of hydration, high impermeability and good resistance to sulfate attack, and the production process is simple and requires low cost and low energy consumption. Supersulfated cement was widely used in the UK, Germany, France, Italy, Belgium, Holland and Luxembourg from the 1940s to the 1960s. However, after the 1970s, with the development of the ironmaking process, the chemical composition of granulated blast-furnace slag has changed, resulting in poor reactivity of the granulated blast-furnace slag. With the original material composition and production process, it became difficult to produce cementing materials whose technical properties meet the engineering demands.

In view of this, the disclosure is proposed.

SUMMARY

A first object of the disclosure is to provide an ultralow-carbon clinker-free cement, in order to solve the contradiction between carbon emissions and strength development in China's cement industry.

A second object of the disclosure is to provide a method for preparing ultralow-carbon clinker-free cement. The method is simple in process and suitable for industrial production.

In order to achieve the above objects of the disclosure, the following technical solutions are adopted:

In a first aspect, the disclosure provides an ultralow-carbon clinker-free cement, prepared from the following raw materials: granulated blast-furnace slag, gypsum and calcium oxide-based material. A weight percentage of calcium oxide and/or calcium hydroxide in the total weight of the obtained cement raw materials is 0.05%-0.75%. Preferably, the weight percentage of the calcium oxide and/or calcium hydroxide in the total weight of the obtained cement raw materials is 0.05%-0.7%, more preferably 0.05%-0.6%, more preferably 0.05%-0.5%, further preferably 0.1%-0.5%, most preferably 0.16%-0.5%.

In a preferred solution, the granulated blast-furnace slag accounts for 65%-95% of the total weight of the raw materials, and the gypsum accounts for 4.5%-34.5% of the total weight of the raw materials. More preferably, the granulated blast-furnace slag accounts for 68%-92% of the total weight of the raw materials, and the gypsum accounts for 7.5%-31.5% of the total weight of the raw materials. Further preferably, the granulated blast-furnace slag accounts for 70%-90% of the total weight of the raw materials, and the gypsum accounts for 9.5%-29.5% of the total weight of the raw materials. More further preferably, the granulated blast-furnace slag accounts for 70%-90% of the total weight of the raw materials, and the gypsum accounts for 9.8%-25% of the total weight of the raw materials.

Based on the same idea, the disclosure further provides another ultralow-carbon clinker-free cement, prepared from the following raw materials: granulated blast-furnace slag, gypsum, cement additives and a calcium oxide-based material. A weight percentage of calcium oxide and/or calcium hydroxide in the total weight of the obtained cement raw materials is 0.05%-0.75%. Preferably, the weight percentage of the calcium oxide and/or calcium hydroxide in the total weight of the obtained cement raw materials is 0.05%-0.7%, more preferably 0.05%-0.6%, more preferably 0.05%-0.5%, further preferably 0.10%-0.5%, most preferably 0.16%-0.5%.

In a preferred solution, the granulated blast-furnace slag accounts for 33%-94% of the total weight of the raw materials, the gypsum accounts for 4.5%-34.5% of the total weight of the raw materials, and the cement additives accounts for 0.65%-32% of the total weight of the raw materials. Preferably, the granulated blast-furnace slag accounts for 35%-90% of the total weight of the raw materials, the gypsum accounts for 9.5%-29.5% of the total weight of the raw materials, and the cement additives accounts for 0.65%-25% of the total weight of the raw materials. Further preferably, the granulated blast-furnace slag accounts for 47%-80% of the total weight of the raw materials, the gypsum accounts for 19.5-20% of the total weight of the raw materials, and the cement additives accounts for 0.65%-5% of the total weight of the raw materials. More further preferably, the granulated blast-furnace slag accounts for 54%-80% of the total weight of the raw materials, the gypsum accounts for 9.8%-19.5% of the total weight of the raw materials, and the cement additives accounts for 10%-20% of the total weight of the raw materials.

Based on the same idea, the disclosure further provides still another ultralow-carbon clinker-free cement, prepared from the following raw materials: granulated blast-furnace slag, gypsum, a set controlling and accelerating component and calcium oxide-based materials. A weight percentage of calcium oxide and/or calcium hydroxide in the total weight of the obtained cement raw materials is 0.05%-0.75%. Preferably, the weight percentage of the calcium oxide and/or calcium hydroxide in the total weight of the obtained cement raw materials is 0.05%-0.7%, more preferably 0.05%-0.6%, more preferably 0.05%-0.5%, further preferably 0.10%-0.3%, most preferably 0.16%-0.2%.

In a preferred solution, the granulated blast-furnace slag accounts for 63%-94% of the total weight of the raw materials, the gypsum accounts for 4.5%-34.5% of the total weight of the raw materials, and the set controlling and accelerating component accounts for 0.9%-1.95% of the total weight of the raw materials. Preferably, the granulated blast-furnace slag accounts for 65%-90% of the total weight of the raw materials, the gypsum accounts for 9.5%-29.5% of the total weight of the raw materials, and the set controlling and accelerating component accounts for 1%-1.5% of the total weight of the raw materials. Further preferably, the granulated blast-furnace slag accounts for 77.5%-79% of the total weight of the raw materials, the gypsum accounts for 9.8%-19.5% of the total weight of the raw materials, and the set controlling and accelerating component accounts for 1%-1.2% of the total weight of the raw materials.

Based on the same idea, the disclosure further provides yet another ultralow-carbon clinker-free cement, prepared from the following raw materials: granulated blast-furnace slag, gypsum, cement additives, a set controlling and accelerating component and a calcium oxide-based material. A weight percentage of calcium oxide and/or calcium hydroxide in the total weight of the obtained cement raw materials is 0.05%-0.75%. Preferably, the weight percentage of the calcium oxide and/or calcium hydroxide in the total weight of the obtained cement raw materials is 0.05%-0.7%, more preferably 0.05%-0.6%, more preferably 0.05%-0.5%, further preferably 0.10%-0.5%, most preferably 0.16%-0.2%.

In a preferred solution, the granulated blast-furnace slag accounts for 31%-93% of the total weight of the raw materials, the gypsum accounts for 4.5%-34.5% of the total weight of the raw materials, the cement additives accounts for 0.65%-32% of the total weight of the raw materials, and the set controlling and accelerating component accounts for 0.9%-1.95% of the total weight of the raw materials. Preferably, the granulated blast-furnace slag accounts for 35%-85% of the total weight of the raw materials, the gypsum accounts for 9.5%-29.5% of the total weight of the raw materials, the cement additives accounts for 1%-20% of the total weight of the raw materials, and the set controlling and accelerating component accounts for 1%-1.5% of the total weight of the raw materials. Further preferably, the granulated blast-furnace slag accounts for 50%-80% of the total weight of the raw materials, the gypsum accounts for 9.8%-19.5% of the total weight of the raw materials, the cement additives accounts for 1%-15% of the total weight of the raw materials, and the set controlling and accelerating component accounts for 1%-1.2% of the total weight of the raw materials.

In the ultralow-carbon clinker-free cement provided by the disclosure, the calcium oxide-based material is a material mainly composed of free calcium oxide and containing 30%-80% of the free calcium oxide. The free calcium oxide is a general term of components in the raw materials that are not combined with acidic oxides and exist in the form of free calcium oxide and/or calcium hydroxide. The content of free calcium oxide can be measured by the test method specified in Chinese Standard GB/T 176-2017. The controlling the weight percentage of the calcium oxide and/or calcium hydroxide in the total weight of the cement raw materials in the disclosure refers to controlling the weight percentage of free calcium oxide in the total weight of the cement raw materials, so the "free calcium oxide" hereafter refers to the general name of components that exist in the form of free calcium oxide and/or calcium hydroxide in the cement raw materials. In the ultralow-carbon clinker-free cement of the disclosure, preferably, the calcium oxide-based material is any one or a combination of at least two of quicklime, slaked lime, industrial calcium oxide, industrial calcium hydroxide, carbide slag, a calcium oxide expansive agent and an ettringite expansive agent. More preferably, the calcium oxide-based material is any one or a combination of at least two of quicklime, slaked lime and carbide slag.

In the ultralow-carbon clinker-free cement provided by the disclosure, the gypsum is any one or a combination of at least two of natural dihydrate gypsum, natural anhydrite, hemihydrate gypsum, a high-strength gypsum, desulfurized gypsum, phosphogypsum or fluorogypsum. Preferably, the gypsum is any one or a combination of at least two of natural dihydrate gypsum, natural anhydrite, hemihydrate gypsum and desulfurized gypsum.

In the solution of the disclosure, the cement additive is any one or a combination of at least two of fly ash, steel slag, limestone, dolomite, a pozzolanic admixture or sandstone. The introduction of the cement additives can further reduce carbon emissions of the cement of the disclosure.

In the solution of the disclosure, the set controlling and accelerating component is any one or a combination of at least two selected from the group consisting of lithium hydroxide, sodium hydroxide, potassium hydroxide, lithium sulfate, sodium sulfate potassium sulfate, aluminum sulfate, lithium carbonate, sodium carbonate, sodium bicarbonate, potassium carbonate, potassium bicarbonate, sodium silicate, lithium chloride, citric acid, sodium citrate or sodium gluconate. Preferably, the set controlling and accelerating component is any one or a combination of at least two selected from the group consisting of lithium hydroxide, sodium hydroxide, lithium sulfate, sodium sulfate, aluminum sulfate, lithium carbonate, citric acid, sodium citrate or sodium gluconate.

In a second aspect, the disclosure provides a method for preparing ultralow-carbon clinker-free cement, specifically including: mixing all raw materials, and grinding the mixture to a specific surface area of 300-700 $m^2/kg$, thereby obtaining the ultralow-carbon clinker-free cement. A weight percentage of free calcium oxide is controlled to be 0.05%-0.75%. Preferably, the weight percentage of the free calcium oxide is controlled to be 0.05%-0.7%, more preferably 0.05%-0.6%, more preferably 0.05%-0.5%, further preferably 0.10%-0.5%, most preferably 0.16%-0.2%.

Preferably, in the method for preparing ultralow-carbon clinker-free cement, before grinding the mixture, cement additives may be used to replace 1%-50% (in weight percentage) of the granulated blast-furnace slag, and then ground with other raw materials, thereby obtaining the ultralow-carbon clinker-free cement.

Preferably, in the method for preparing ultralow-carbon clinker-free cement, before grinding the mixture, a set controlling and accelerating component may be used to replace 0.1%-3% (in weight percentage) of the granulated blast-furnace slag, and then ground with other raw materials, thereby obtaining the ultralow-carbon clinker-free cement.

Preferably, in the method for preparing ultralow-carbon clinker-free cement, before grinding the mixture, cement additives and a set controlling and accelerating component may be used to replace the granulated blast-furnace slag, and then ground with other raw materials, thereby obtaining the ultralow-carbon clinker-free cement. In weight percentage, the cement additives replaces 1%-50% of the granulated blast-furnace slag, and the set controlling and accelerating component replaces 0.1%-3% of the granulated blast-furnace slag.

In a preferred method embodiment of the disclosure, the method specifically includes: mixing all raw materials, and grinding the mixture to a specific surface area of 300-700 $m^2/kg$, thereby obtaining the ultralow-carbon clinker-free cement. A weight percentage of free calcium oxide is controlled to be 0.05%-0.75%. Preferably, the weight percentage of the free calcium oxide is controlled to be 0.05%-0.7%, more preferably 0.05%-0.6%, more preferably 0.05%-0.5%, further preferably 0.10%-0.5%, most preferably 0.16%-0.2%.

In another preferred method embodiment of the disclosure, the method specifically includes: grinding granulated blast-furnace slag to a specific surface area of 200-1200 $m^2/kg$; and grinding all other raw materials to a specific surface area of 300-700 $m^2/kg$, then adding the ground granulated blast-furnace slag, and mixing all the raw materials, thereby obtaining the ultralow-carbon clinker-free cement. A weight percentage of free calcium oxide is controlled to be 0.05%-0.75%. Preferably, the weight percentage of the free calcium oxide is controlled to be 0.05%-0.7%, more preferably 0.05%-0.6%, more preferably 0.05%-0.5%, further preferably 0.10%-0.5%, most preferably 0.16%-0.2%.

In a third aspect, the disclosure further provides application of ultralow-carbon clinker-free cement in the preparation of concrete, mortar or cement products. In the application, the ultralow-carbon clinker-free cement of the disclosure may be blended with several of mineral admixtures, aggregate, fibers, additives, water, etc. to prepare concrete, mortar or cement products.

In the prior art, in order to activate the granulated blast-furnace slag, a typical method is to add an alkaline activator, such as Portland cement, Portland cement clinker, calcium oxide, etc. It has been studied that an insufficient amount of cement clinker added cannot provide sufficient activation function, and an excessive amount will inhibit hydration of granulated blast-furnace slag. In fact, in terms of Portland cement, Portland cement clinker, calcium oxide or the like that serves as an activator raw material with complex composition, people still do not know enough about the key components and their mechanism, so it is difficult to find an appropriate amount of the above-mentioned alkaline activator. If the amount is too small, the activator cannot effectively activate the granulated blast-furnace slag, and the prepared cement has low hardening speed, low early strength and low long-term strength, and may have been carbonated and corroded due to its low hardening speed. If the amount is too high, although the early strength is significantly increased, and the long-term strength is greatly reduced, which makes the cement fail to meet the engineering demands. Through experiments, the inventors have found that a proper amount of calcium oxide-based material mainly composed of free calcium oxide and/or calcium hydroxide, such as quicklime, can effectively activate granulated blast-furnace slag so as to prepare cement with excellent properties. Firstly, the calcium oxide-based material mainly composed of free calcium oxide and/or calcium hydroxide, such as quicklime, reacts quickly with water to release a large amount of OH, which activates hydration of granulated blast-furnace slag so as to release $[Al(OH)_4]^-$. $Ca^{2+}$, also released by the reaction between quicklime and water, reacts with $SO_4^{2-}$ released by part of $[Al(OH)_4]^-$ and gypsum to generate ettringite, and the remaining [Al(OH).]-forms alumina gel. The ettringite is a fibrous crystal that has high strength and can fill pores, and the alumina gel is a colloidal capable of gelling, and thus can bond the ettringite crystals together to form a dense hardened body, so that the cement has high early strength and long-term strength. Secondly, the inventors have also found that the increase of strength produced by the activation of the calcium oxide-based material such as quicklime has already been close to the limit when the dosage is low (the weight percentage of the free calcium oxide and/or calcium hydroxide incorporated with various calcium oxide-based materials is 0.05%-0.75%), which is the optimal dosage range. This dosage range can not only provide a proper amount of OH⁻ to effectively activate the granulated blast furnace slag, but also provide a proper amount of $Ca^{2+}$ to generate proper amounts of ettringite and aluminum gel. The addition of more calcium oxide-based material such as quicklime may lead to the generation of excessive $Ca(OH)_2$. $Ca(OH)_2$ may react with the alumina gel and the ettringite to generate monosulfate type calcium sulfoaluminate hydrate that is low in strength, easily carbonated and less resistant to corrosion. Moreover, this reaction may cause a reduction in the volume of the product, resulting in a loose hardened body with increased porosity. This reaction may also consume the alumina gel capable of gelling, resulting in an insufficient amount of colloidal in the system to bond other substances. Thus, the strength of the cement is significantly reduced, and the generated monosulfate type calcium sulfoaluminate hydrate is easily carbonated, making the cement easily carbonated and corroded. Besides, the calcium oxide-based material such as quicklime has moderate hydration reaction speed and $Ca^{2+}$ and OH-release speed in the system. The calcium oxide and/or calcium hydroxide in this type of material have high activity and high reaction speed with water, which is conducive to activate the granulated blast-furnace slag as quickly as possible, so that the cement can have high strength at the early stage, which prevents the cement from being carbonated and corroded due to its too low hardening speed. Actually, the reaction speed is more important for the cement strength than the amount of the calcium oxide-based material added. In the prior art, although adding Portland cement or Portland cement clinker serving as the alkaline activator to tricalcium silicate and dicalcium silicate serving as the main components can also release $Ca^{2+}$ and OH⁻, the reaction speed is too low. It usually takes 1 to 7 days to generate enough effective activation components, which makes the early strength of cement low and the hardening speed too low and leads to serious carbonation and corrosion. In order to increase the hardening speed and early strength of the cement, a typical method is to increase the dosage of the alkaline activators. However, these substances may release excessive $Ca^{2+}$ and OH⁻, which may greatly reduce the long-term strength. In the prior art, sodium hydroxide or sodium silicate may also be used as the alkaline activator. This type of material can quickly release OH that activates the hydration reaction of granulated blast-furnace slag, but cannot provide $Ca^{2+}$ to produce high-strength hydration products like ettringite crystals, so the strength of this cement system is not high either. In the prior art, calcium oxide or calcium hydroxide may also be used as the alkaline activator. However, since the mechanism of interaction between calcium oxide or calcium hydroxide and granulated blast-furnace slag has not been fully understood, and the hazards and mechanism of excessive calcium oxide or calcium hydroxide have not been understood either, this type of activator is always dosed excessively, and therefore no cement with excellent properties has been prepared.

Compared with the prior art, the disclosure has the following beneficial effects:

According to the ultralow-carbon clinker-free cement provided by the disclosure, by directly adding proper amounts of non-clinker components rich in free calcium oxide, i.e., quicklime, slaked lime, etc., the proportion of free calcium oxide in the formula is controlled within an appropriate range, and the free calcium oxide and/or calcium hydroxide can quickly release proper amounts of $Ca^{2+}$ and OH⁻ at the early stage of hydration, so that the granulated blast-furnace slag reacts with the gypsum to generate microexpansive ettringite with high strength, carbonation resistance and corrosion resistance. Moreover, the content of the free calcium oxide and/or calcium hydroxide is controlled, which avoids the reaction between alumina gel and ettringite due to excessive $Ca^{2+}$ and OH⁻, leading to the generation of the monosulfate type calcium sulfoaluminate hydrate that is low in strength, easily carbonated and less resistant to corrosion. The ultralow-carbon clinker-free cement of the disclosure has the advantages of high early strength, ultrahigh long-term strength, low shrinkage, carbonation resistance, low carbon emissions, etc.

BRIEF DESCRIPTION OF DRAWINGS

FIG. 1 a comparison diagram of DTA curves of hydration products of a cement of Application Example 1 and a cement of Comparative Example 2 after curing for 28 days.

DETAILED DESCRIPTION OF EMBODIMENTS

The disclosure provides an ultralow-carbon clinker-free cement, prepared from the following raw materials: granulated blast-furnace slag, gypsum and a calcium oxide-based material. A weight percentage of free calcium oxide in the total weight of the obtained cement raw materials is controlled to be 0.05%-0.75%. Preferably, the weight percentage of the free calcium oxide in the total weight of the obtained cement raw materials is controlled to be 0.05%-0.7%, more preferably 0.05%-0.6%, more preferably 0.05%-0.5%, further preferably 0.10%-0.5%, most preferably 0.16%-0.2%. Further preferably, a percentage of the granulated blast-furnace slag in the total weight of the raw materials may be 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94% or 95%. Further preferably, a percentage of the gypsum in the total weight of the raw materials may be 4.5%, 5.0%, 8%, 10%, 12.5%, 15%, 18%, 20%, 22.5%, 25%, 27.5%, 30%, 32% or 34.5%. Further preferably, the content of the free calcium oxide in the total weight of the obtained cement raw materials is 0.05%, 0.08%, 0.1%, 0.12%, 0.16%, 0.18%, 0.25%, 0.28%, 0.3%, 0.35%, 0.4%, 0.45%, 0.5%, 0.55%, 0.6%, 0.65%, 0.7% or 0.75%.

The disclosure provides another ultralow-carbon clinker-free cement, prepared from the following raw materials: granulated blast-furnace slag, gypsum, cement additivesand acalcium oxide-based material. A weight percentage of free calcium oxide in the total weight of the obtained cement raw materials is 0.05%-0.75%. Preferably, the weight percentage of the free calcium oxide in the total weight of the obtained cement raw materials is 0.05%-0.7%, more preferably 0.05%-0.6%, more preferably 0.05%-0.5%, further preferably 0.10%-0.5%, most preferably 0.16%-0.2%. Further preferably, a percentage of the granulated blast-furnace slag in the total weight of the raw materials may be 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93% or 94%. Further preferably, a percentage of the gypsum in the total weight of the raw materials may be 4.5%, 5.0%, 8%, 10%, 12.5%, 15%, 18%, 20%, 22.5%, 25%, 27.5%, 30%, 32% or 34.5%. Further preferably, a percentage of the cement additives in the total weight of the raw materials may be 0.65%, 1.5%, 5.5%, 7.5%, 10.5%, 12.5%, 15.5%, 17.5%, 20.5%, 22.5%, 25.5%, 27.5%, 30.5% or 32%. Further preferably, the content of the free calcium oxide in the total weight of the obtained cement raw materials is 0.05%, 0.08%, 0.1%, 0.12%, 0.16%, 0.18%, 0.25%, 0.28%, 0.3%, 0.35%, 0.4%, 0.45%, 0.5%, 0.55%, 0.6%, 0.65%, 0.7% or 0.75%.

The disclosure provides still another ultralow-carbon clinker-free cement, prepared from the following raw materials: granulated blast-furnace slag, gypsum, a set controlling and accelerating component and a calcium oxide-based material. A weight percentage of free calcium oxide in the total weight of the obtained cement raw materials is 0.05%-0.75%. Preferably, the weight percentage of the free calcium oxide in the total weight of the obtained cement raw materials is 0.05%-0.7%, more preferably 0.05%-0.6%, more preferably 0.05%-0.5%, further preferably 0.10%-0.5%, most preferably 0.16%-0.2%. Further preferably, a percentage of the granulated blast-furnace slag in the total weight of the raw materials may be 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94% or 95%. Further preferably, a percentage of the gypsum in the total weight of the raw materials may be 4.5%, 5.0%, 8%, 10%, 12.5%, 15%, 18%, 20%, 22.5%, 25%, 27.5%, 30%, 32% or 34.5%. Further preferably, a percentage of the set controlling and accelerating component in the total weight of the raw materials may be 0.9%, 1.0%, 1.2%, 1.5%, 1.6%, 1.7%, 1.8%, 1.9% or 1.95%. Further preferably, the weight percentage of the free calcium oxide in the total weight of the obtained cement raw materials is 0.05%, 0.08%, 0.1%, 0.12%, 0.16%, 0.18%, 0.25%, 0.28%, 0.3%, 0.35%, 0.4%, 0.45%, 0.5%, 0.55%, 0.6%, 0.65%, 0.7% or 0.75%.

The disclosure provides yet another ultralow-carbon clinker-free cement, prepared from the following raw materials: granulated blast-furnace slag, gypsum, cement additives, a set controlling and accelerating component and a calcium oxide-based material. A weight percentage of free calcium oxide in the total weight of the obtained cement raw materials is 0.05%-0.75%. Preferably, the weight percentage of the free calcium oxide in the total weight of the obtained cement raw materials is 0.05%-0.7%, more preferably 0.05%-0.6%, more preferably 0.05%-0.5%, further preferably 0.10%-0.5%, most preferably 0.16%-0.2%. Further preferably, a percentage of the granulated blast-furnace slag in the total weight of the raw materials may be 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93% or 94%. Further preferably, a percentage of the gypsum in the total weight of the raw materials may be 4.5%, 5.0%, 8%, 10%, 12.5%, 15%, 18%, 20%, 22.5%, 25%, 27.5%, 30%, 32% or 34.5%. Further preferably, a percentage of the cement additives in the total weight of the raw materials may be 0.65%, 1.5%, 5.5%, 7.5%, 10.5%, 12.5%, 15.5%, 17.5%, 20.5%, 22.5%, 25.5%, 27.5%, 30.5% or 32%. Further preferably, a percentage of the set controlling and accelerating component in the total weight of the raw materials may be 0.9%, 1.0%, 1.2%, 1.5%, 1.6%, 1.7%, 1.8%, 1.9% or 1.95%. Further preferably, the content of the free calcium oxide in the total weight of the obtained cement raw materials is 0.05%, 0.08%, 0.1%, 0.12%, 0.16%, 0.18%, 0.25%, 0.28%, 0.3%, 0.35%, 0.4%, 0.45%, 0.5%, 0.55%, 0.6%, 0.65%, 0.7% or 0.75%.

In the ultralow-carbon clinker-free cement provided by the disclosure, the gypsum is any one or a combination of at least two of natural dihydrate gypsum, natural anhydrite, hemihydrate gypsum, a high-strength gypsum, desulfurized gypsum, phosphogypsum or fluorogypsum. Preferably, the gypsum is any one or a combination of at least two of natural dihydrate gypsum, natural anhydrite, hemihydrate gypsum and desulfurized gypsum.

In the ultralow-carbon clinker-free cement provided by the disclosure, the calcium oxide-based material is a material mainly composed of free calcium oxide and containing 30%-80% of the free calcium oxide. For example, the content of the free calcium oxide may be ≥30%, ≥35%, ≥40%, ≥45%, ≥50%, ≥55%, ≥60%, ≥65%, ≥70%, ≥75% or ≥80%. The free calcium oxide is a general term of components in the raw materials that are not combined with acidic oxides and exist in the form of free calcium oxide and/or calcium hydroxide. The content of free calcium oxide can be measured by the test method specified in Chinese Standard GB/T 176-2017. Preferably, the calcium oxide-based material is any one or a combination of at least two of quicklime, slaked lime, industrial calcium oxide, industrial calcium hydroxide, carbide slag, a calcium oxide expansive agent and an ettringite expansive agent. More preferably, the calcium oxide-based material is any one or a combination of at least two of quicklime, slaked lime and carbide slag.

In the solution of the disclosure, the cement additives is any one or a combination of at least two of fly ash, steel slag, limestone, dolomite, a pozzolanic admixture or sandstone. The introduction of the cement additives can further reduce carbon emissions of the cement of the disclosure.

In the solution of the disclosure, the set controlling and accelerating component is any one or a combination of at least two selected from the group consisting of lithium hydroxide, sodium hydroxide, potassium hydroxide, lithium sulfate, sodium sulfate potassium sulfate, aluminum sulfate, lithium carbonate, sodium carbonate, sodium bicarbonate, potassium carbonate, potassium bicarbonate, sodium silicate, lithium chloride, citric acid, sodium citrate or sodium gluconate. Preferably, the set controlling and accelerating component is any one or a combination of at least two selected from the group consisting of lithium hydroxide, sodium hydroxide, lithium sulfate, sodium sulfate, aluminum sulfate, lithium carbonate, citric acid, sodium citrate or sodium gluconate.

The solutions and technical effects of the disclosure will be further explained by way of enumeration of examples below, but the solutions of the disclosure is not limited to the enumerated examples.

Example 1 to Example 11

An ultralow-carbon clinker-free cement, as shown in Table 1 below, was prepared from the following raw materials in weight percentage: 78.75%-79.94% of granulated blast-furnace slag, 20% of natural dihydrate gypsum and the balance of quicklime. A content of CaO in the quicklime was 80%.

A method for preparing the ultralow-carbon clinker-free cement included: all the raw materials, as shown in Table 1 below, were proportionally mixed, ground to a specific surface area of 500 m$^2$/kg, and mixed uniformly, thereby obtaining the ultralow-carbon clinker-free cement. A weight percentage of free calcium oxide was controlled to be 0.05%-1.00%.

TABLE 1

| Example No. | Mix proportion of raw material (%) | | | Specific surface area after grinding (m$^2$/kg) | Weight percentage of free calcium oxide in raw materials (%) |
| | Granulated blast-furnace slag | Natural dihydrate gypsum | Quicklime | | |
| --- | --- | --- | --- | --- | --- |
| 1 | 79.94 | 20.00 | 0.06 | 500 | 0.05 |
| 2 | 79.88 | 20.00 | 0.13 | 500 | 0.10 |

TABLE 1-continued

| Example No. | Mix proportion of raw material (%) | | | Specific surface area after grinding (m$^2$/kg) | Weight percentage of free calcium oxide in raw materials (%) |
| | Granulated blast-furnace slag | Natural dihydrate gypsum | Quicklime | | |
| --- | --- | --- | --- | --- | --- |
| 3 | 79.80 | 20.00 | 0.20 | 500 | 0.16 |
| 4 | 79.75 | 20.00 | 0.25 | 500 | 0.20 |
| 5 | 79.69 | 20.00 | 0.31 | 500 | 0.25 |
| 6 | 79.63 | 20.00 | 0.38 | 500 | 0.30 |
| 7 | 79.50 | 20.00 | 0.50 | 500 | 0.40 |
| 8 | 79.38 | 20.00 | 0.63 | 500 | 0.50 |
| 9 | 79.25 | 20.00 | 0.75 | 500 | 0.60 |
| 10 | 79.12 | 20.00 | 0.88 | 500 | 0.70 |
| 11 | 79.06 | 20.00 | 0.94 | 500 | 0.75 |

Example 12 to Example 20

An ultralow-carbon clinker-free cement, as shown in Table 2 below, was prepared from the following raw materials in weight percentage: 65.30%-95.30% of granulated blast-furnace slag, 4.50%-34.50% of natural dihydrate gypsum and 0.2% of quicklime. A content of CaO in the quicklime was 80%.

A method for preparing the ultralow-carbon clinker-free cement included: all the raw materials, as shown in Table 2 below, were proportionally mixed, ground to a specific surface area of 500 m$^2$/kg, and mixed uniformly, thereby obtaining the ultralow-carbon clinker-free cement. A weight percentage of free calcium oxide was controlled to be 0.16%.

TABLE 2

| Example No. | Mix proportion of raw material (%) | | | Specific surface area after grinding (m$^2$/kg) | Weight percentage of free calcium oxide in raw materials (%) |
| | Granulated blast-furnace slag | Natural dihydrate gypsum | Quicklime | | |
| --- | --- | --- | --- | --- | --- |
| 12 | 65.30 | 34.50 | 0.20 | 500 | 0.16 |
| 13 | 68.30 | 31.50 | 0.20 | 500 | 0.16 |
| 14 | 70.30 | 29.50 | 0.20 | 500 | 0.16 |
| 15 | 74.80 | 25.00 | 0.20 | 500 | 0.16 |
| 3 | 79.80 | 20.00 | 0.20 | 500 | 0.16 |
| 16 | 84.80 | 15.00 | 0.20 | 500 | 0.16 |
| 17 | 90.00 | 9.80 | 0.20 | 500 | 0.16 |
| 18 | 92.30 | 7.50 | 0.20 | 500 | 0.16 |
| 19 | 95.00 | 4.80 | 0.20 | 500 | 0.16 |
| 20 | 95.30 | 4.50 | 0.20 | 500 | 0.16 |

Example 21 to Example 25

An ultralow-carbon clinker-free cement, as shown in Table 3 below, was prepared from the following raw materials in weight percentage: 79.80% of granulated blast-furnace slag, 20.00% of natural dihydrate gypsum and 0.20% of quicklime. A content of CaO in the quicklime was 80%.

A method for preparing the ultralow-carbon clinker-free cement included: all the raw materials were proportionally mixed, ground to a specific surface area of 200-1200 m$^2$/kg, and mixed uniformly, thereby obtaining the ultralow-carbon clinker-free cement. A weight percentage of free calcium oxide was controlled to be 0.16%.

TABLE 3

| Example No. | Mix proportion of raw material (%) | | | Specific surface area after grinding (m²/kg) | Weight percentage of free calcium oxide in raw materials (%) |
|---|---|---|---|---|---|
| | Granulated blast-furnace slag | Natural dihydrate gypsum | Quicklime | | |
| 21 | 79.80 | 20.00 | 0.20 | 200 | 0.16 |
| 22 | 79.80 | 20.00 | 0.20 | 300 | 0.16 |
| 3 | 79.80 | 20.00 | 0.20 | 500 | 0.16 |
| 23 | 79.80 | 20.00 | 0.20 | 700 | 0.16 |
| 24 | 79.80 | 20.00 | 0.20 | 1000 | 0.16 |
| 25 | 79.80 | 20.00 | 0.20 | 1200 | 0.16 |

Example 26 to Example 32

An ultralow-carbon clinker-free cement, as shown in Table 4 below, was prepared from the following raw materials in weight percentage: 79.20%-79.82% of granulated blast-furnace slag, 20.00% of natural dihydrate gypsum and the balance of quicklime or slaked lime. A content of CaO in the quicklime was 20%-90%.

A method for preparing the ultralow-carbon clinker-free cement included: all the raw materials were proportionally mixed, ground to a specific surface area of 500 m²/kg, and mixed uniformly, thereby obtaining the ultralow-carbon clinker-free cement. A weight percentage of free calcium oxide was controlled to be 0.16%.

TABLE 4

| Example No. | Mix proportion of raw material (%) | | | | Content of CaO in calcium oxide-based material | Specific surface area after grinding (m²/kg) | Weight percentage of free calcium oxide in raw materials (%) |
|---|---|---|---|---|---|---|---|
| | Granulated blast-furnace slag | Natural dihydrate gypsum | Source of calcium oxide and/or calcium hydroxide | | | | |
| | | | Quicklime | Slaked lime | | | |
| 26 | 79.82 | 20.00 | 0.18 | | 90% | 500 | 0.16 |
| 3 | 79.80 | 20.00 | 0.20 | | 80% | 500 | 0.16 |
| 27 | 79.77 | 20.00 | 0.23 | | 70% | 500 | 0.16 |
| 28 | 79.73 | 20.00 | 0.27 | | 60% | 500 | 0.16 |
| 29 | 79.68 | 20.00 | 0.32 | | 50% | 500 | 0.16 |
| 30 | 79.60 | 20.00 | 0.40 | | 40% | 500 | 0.16 |
| 31 | 79.47 | 20.00 | 0.53 | | 30% | 500 | 0.16 |
| 32 | 79.77 | 20.00 | | 0.23 | 70% | 500 | 0.16 |

Example 33 to Example 41

An ultralow-carbon clinker-free cement, as shown in Table 5 below, was prepared from the following raw materials in weight percentage: 47.80%-79.15% of granulated blast-furnace slag, 20% of natural dihydrate gypsum, 0.65%-32% of fly ash and 0.20% of quicklime. A content of CaO in the quicklime was 80%.

A method for preparing the ultralow-carbon clinker-free cement included: all the raw materials were proportionally mixed, ground to a specific surface area of 500 m²/kg, and mixed uniformly, thereby obtaining the ultralow-carbon clinker-free cement. A weight percentage of free calcium oxide was controlled to be 0.16%.

TABLE 5

| Example No. | Mix proportion of raw material (%) | | | | Specific surface area after grinding (m²/kg) | Weight percentage of free calcium oxide in raw materials (%) |
|---|---|---|---|---|---|---|
| | Granulated blast-furnace slag | Natural dihydrate gypsum | Fly ash | Quicklime | | |
| 33 | 79.15 | 20 | 0.65 | 0.20 | 500 | 0.16 |
| 34 | 74.80 | 20 | 5 | 0.20 | 500 | 0.16 |
| 35 | 69.80 | 20 | 10 | 0.20 | 500 | 0.16 |
| 36 | 64.80 | 20 | 15 | 0.20 | 500 | 0.16 |
| 37 | 61.80 | 20 | 18 | 0.20 | 500 | 0.16 |
| 38 | 59.80 | 20 | 20 | 0.20 | 500 | 0.16 |
| 39 | 54.80 | 20 | 25 | 0.20 | 500 | 0.16 |
| 40 | 49.80 | 20 | 30 | 0.20 | 500 | 0.16 |
| 41 | 47.80 | 20 | 32 | 0.20 | 500 | 0.16 |

Example 42 to Example 50

An ultralow-carbon clinker-free cement, as shown in Table 6 below, was prepared from the following raw materials in weight percentage: 47.80%-79.15% of granulated blast-furnace slag, 20% of natural dihydrate gypsum, 0.65%-32% of limestone powder and 0.20% of quicklime. A content of CaO in the quicklime was 80%.

A method for preparing the ultralow-carbon clinker-free cement included: all the raw materials were proportionally mixed, ground to a specific surface area of 500 m²/kg, and mixed uniformly, thereby obtaining the ultralow-carbon clinker-free cement. A weight percentage of free calcium oxide was controlled to be 0.16%.

TABLE 6

| Example No. | Mix proportion of raw material (%) | | | | Specific surface area after grinding (m²/kg) | Weight percentage of free calcium oxide in raw materials (%) |
| --- | --- | --- | --- | --- | --- | --- |
| | Granulated blast-furnace slag | Natural dihydrate gypsum | Limestone powder | Quicklime | | |
| 42 | 79.15 | 20 | 0.65 | 0.20 | 500 | 0.16 |
| 43 | 74.80 | 20 | 5 | 0.20 | 500 | 0.16 |
| 44 | 69.80 | 20 | 10 | 0.20 | 500 | 0.16 |
| 45 | 64.80 | 20 | 15 | 0.20 | 500 | 0.16 |
| 46 | 61.80 | 20 | 18 | 0.20 | 500 | 0.16 |
| 47 | 59.80 | 20 | 20 | 0.20 | 500 | 0.16 |
| 48 | 54.80 | 20 | 25 | 0.20 | 500 | 0.16 |
| 49 | 49.80 | 20 | 30 | 0.20 | 500 | 0.16 |
| 50 | 47.80 | 20 | 32 | 0.20 | 500 | 0.16 |

Example 51 to Example 55

An ultralow-carbon clinker-free cement, as shown in Table 7 below, was prepared from the following raw materials in weight percentage: 61.80% of granulated blast-furnace slag, 20% of natural dihydrate gypsum, 2%-16% of fly ash, 2%-16% of limestone powder and 0.20% of quicklime. A content of CaO in the quicklime was 80%.

A method for preparing the ultralow-carbon clinker-free cement included: all the raw materials were proportionally mixed, ground to a specific surface area of 500 m²/kg, and mixed uniformly, thereby obtaining the ultralow-carbon clinker-free cement. A weight percentage of free calcium oxide was controlled to be 0.16%.

TABLE 7

| Example No. | Mix proportion of raw material (%) | | | | | Specific surface area after grinding (m²/kg) | Weight percentage of free calcium oxide in raw materials (%) |
| --- | --- | --- | --- | --- | --- | --- | --- |
| | Granulated blast-furnace slag | Natural dihydrate gypsum | Cement additives | | Quicklime | | |
| | | | Fly ash | Limestone powder | | | |
| 51 | 61.80 | 20 | 2 | 16 | 0.2 | 500 | 0.16 |
| 52 | 61.80 | 20 | 6 | 12 | 0.2 | 500 | 0.16 |
| 53 | 61.80 | 20 | 9 | 9 | 0.2 | 500 | 0.16 |
| 54 | 61.80 | 20 | 12 | 6 | 0.2 | 500 | 0.16 |
| 55 | 61.80 | 20 | 16 | 2 | 0.2 | 500 | 0.16 |

Example 56 to Example 76

An ultralow-carbon clinker-free cement, as shown in Table 8 below, was prepared from the following raw materials in weight percentage: 77.85%-79.80% of granulated blast-furnace slag, 20% of natural dihydrate gypsum, 0.9%-1.95% of set controlling and accelerating component and 0.20% of quicklime. A content of CaO in the quicklime was 80%.

A method for preparing the ultralow-carbon clinker-free cement included: all the raw materials were proportionally mixed, ground to a specific surface area of 500 m²/kg, and mixed uniformly, thereby obtaining the ultralow-carbon clinker-free cement. A weight percentage of free calcium oxide was controlled to be 0.16%.

TABLE 8

| Example No. | Granulated blast-furnace slag | Natural dihydrate gypsum | Sodium hydroxide | Lithium carbonate | Aluminum sulfate | Lithium hydroxide | Lithium sulfate | Sodium sulfate |
|---|---|---|---|---|---|---|---|---|
| 56 | 78.9 | 20 | 0.9 | | | | | |
| 57 | 78.8 | 20 | | 1 | | | | |
| 58 | 78.6 | 20 | | | 1.2 | | | |
| 59 | 78.4 | 20 | | | | 1.4 | | |
| 60 | 78.3 | 20 | | | | | 1.5 | |
| 61 | 78 | 20 | | | | | | 1.8 |
| 62 | 77.85 | 20 | | | | | | |
| 63 | 78.9 | 20 | | | | | | |
| 64 | 78.8 | 20 | | | | | | |
| 65 | 78.6 | 20 | | | | | | |
| 66 | 78.4 | 20 | 0.7 | 0.7 | | | | |
| 67 | 77.9 | 20 | 0.7 | | 1.2 | | | |
| 68 | 78 | 20 | 0.9 | | | 0.9 | | |
| 69 | 77.85 | 20 | | | | | 0.95 | 1 |
| 70 | 78.9 | 20 | | | | | | |
| 71 | 78.8 | 20 | | | | | | |
| 72 | 78.6 | 20 | 0.4 | 0.4 | 0.4 | | | |
| 73 | 78.4 | 20 | | | | 1 | 0.2 | 0.2 |
| 74 | 78.3 | 20 | | | | | | |
| 75 | 78 | 20 | | | | | | |
| 76 | 77.85 | 20 | 1 | | | | | |

| Example No. | Potassium carbonate | Citric acid | Sodium citrate | Sodium gluconate | Quicklime | Specific surface area after grinding (m$^2$/kg) | Weight percentage of free calcium oxide in raw materials (%) |
|---|---|---|---|---|---|---|---|
| 56 | | | | | 0.20 | 500 | 0.16 |
| 57 | | | | | 0.20 | 500 | 0.16 |
| 58 | | | | | 0.20 | 500 | 0.16 |
| 59 | | | | | 0.20 | 500 | 0.16 |
| 60 | | | | | 0.20 | 500 | 0.16 |
| 61 | | | | | 0.20 | 500 | 0.16 |
| 62 | 1.95 | | | | 0.20 | 500 | 0.16 |
| 63 | | 0.9 | | | 0.20 | 500 | 0.16 |
| 64 | | | 1 | | 0.20 | 500 | 0.16 |
| 65 | | | | 1.2 | 0.20 | 500 | 0.16 |
| 66 | | | | | 0.20 | 500 | 0.16 |
| 67 | | | | | 0.20 | 500 | 0.16 |
| 68 | | | | | 0.20 | 500 | 0.16 |
| 69 | | | | | 0.20 | 500 | 0.16 |
| 70 | 0.4 | 0.5 | | | 0.20 | 500 | 0.16 |
| 71 | | | 0.5 | 0.5 | 0.20 | 500 | 0.16 |
| 72 | | | | | 0.20 | 500 | 0.16 |
| 73 | | | | | 0.20 | 500 | 0.16 |
| 74 | 0.5 | 1 | | | 0.20 | 500 | 0.16 |
| 75 | | 1 | 0.8 | | 0.20 | 500 | 0.16 |
| 76 | | | | 0.95 | 0.20 | 500 | 0.16 |

Example 77 to Example 80

An ultralow-carbon clinker-free cement, as shown in Table 9 below, was prepared from the following raw materials in weight percentage: 60.60% of granulated blast-furnace slag, 20% of natural dihydrate gypsum, 18% of admixture, 1.2% of set controlling and accelerating component and 0.20% of quicklime. A content of CaO in the quicklime was 80%.

A method for preparing the ultralow-carbon clinker-free cement included: all the raw materials were proportionally mixed, ground to a specific surface area of 500 m$^2$/kg, and mixed uniformly, thereby obtaining the ultralow-carbon clinker-free cement. A weight percentage of free calcium oxide was controlled to be 0.16%.

TABLE 9

| Example No. | Mix proportion of raw material (%) | | | | | | | Specific surface area after grinding (m²/kg) | Weight percentage of free calcium oxide in raw materials (%) |
|---|---|---|---|---|---|---|---|---|---|
| | Granulated blast-furnace slag | Natural dihydrate gypsum | Cement additives | | Set controlling and accelerating component | | Quicklime | | |
| | | | Fly ash | Limestone powder | Lithium carbonate | Aluminum sulfate | | | |
| 77 | 60.60 | 20 | 18 | 0 | 1.2 | 0 | 0.20 | 500 | 0.16 |
| 78 | 60.60 | 20 | 18 | 0 | 0.6 | 0.6 | 0.20 | 500 | 0.16 |
| 79 | 60.60 | 20 | 9 | 9 | 1.2 | 0 | 0.20 | 500 | 0.16 |
| 80 | 60.60 | 20 | 9 | 9 | 0.6 | 0.6 | 0.20 | 500 | 0.16 |

Application Examples 1 to 11

The ultralow-carbon clinker-free cement of Example 1 to Example 11 and water were mixed in a water-to-binder ratio of 0.4 according to Chapter 7.2 in GB 1346 to prepare a neat paste. The net paste was molded according to Chapter 7 in GB/T 17671, cured to 1 day, 3 days and 28 days according to Chapter 8 in GB/T 17671, and tested for its compressive strength and flexural strength according to Chapter 9 in GB/T 17671. The test results are shown in Table 10:

TABLE 10

| Application Example No. | Compressive strength (MPa) | | | Flexural strength (MPa) | | |
|---|---|---|---|---|---|---|
| | 1 d | 3 d | 28 d | 1 d | 3 d | 28 d |
| 1 | 11.0 | 40.6 | 81.2 | 3.3 | 10.2 | 13.8 |
| 2 | 16.0 | 45.2 | 83.5 | 4.8 | 11.3 | 14.2 |
| 3 | 20.2 | 55.3 | 85.5 | 6.1 | 13.8 | 14.5 |
| 4 | 22.0 | 53.6 | 83.8 | 6.6 | 13.4 | 14.2 |
| 5 | 24.1 | 52.5 | 82.1 | 7.2 | 13.1 | 14.0 |
| 6 | 26.5 | 51.4 | 80.4 | 8.0 | 12.9 | 13.7 |
| 7 | 27.4 | 50.3 | 78.7 | 8.2 | 12.6 | 13.4 |
| 8 | 25.2 | 49.8 | 71.1 | 7.6 | 12.4 | 13.2 |
| 9 | 23.6 | 47.7 | 68.5 | 7.1 | 11.9 | 13.0 |
| 10 | 20.7 | 47.4 | 65.1 | 6.2 | 11.9 | 12.4 |
| 11 | 18.8 | 47.0 | 61.6 | 5.6 | 11.8 | 12.3 |

As shown in Table 10 above, in the ultralow-carbon clinker-free cement of Examples 1 to 11 of the disclosure, no Portland cement clinker was added, a proper amount of quicklime rich in free calcium oxide was directly added as the activator, and the total calcium oxide in the total amount of the raw materials was controlled within a certain range (0.05%-0.75%), so that the finally obtained cement had very excellent early strength and long-term strength. After being molded and cured for 1 day, the cement of the above examples could have a compressive strength of 11-27.4 MPa and a flexural strength of 3.3-8.2 MPa. After 3 days, the compressive strength could be above 40 MPa, and the flexural strength could be above 10 MPa. This indicated that by directly adding the quicklime containing the free calcium oxide capable of hydration reaction, proper amounts of $Ca^{2+}$ and $OH^-$ were quickly released, and the quicklime quickly reacted with water, so that the granulated blast-furnace slag was quickly activated, making the cement have higher strength at the early stage. Besides, after being molded and cured for 28 days, the cement of the above examples could have a compressive strength of up to 60-85 MPa and a flexural strength of up to 12-14 MPa, indicating an ultrahigh long-term strength.

Application Examples 12 to 20

The ultralow-carbon clinker-free cement of Example 12 to Example 20 and water were mixed in a water-to-binder ratio of 0.4 according to Chapter 7.2 in GB 1346 to prepare a neat paste. The net paste was molded according to Chapter 7 in GB/T 17671, cured to 1 day, 3 days and 28 days according to Chapter 8 in GB/T 17671, and tested for its compressive strength and flexural strength according to Chapter 9 in GB/T 17671. The test results are shown in Table 11:

TABLE 11

| Application Example No. | Compressive strength (MPa) | | | Flexural strength (MPa) | | |
|---|---|---|---|---|---|---|
| | 1 d | 3 d | 28 d | 1 d | 3 d | 28 d |
| 12 | 15.1 | 40.7 | 61.8 | 4.7 | 10.8 | 11.3 |
| 13 | 15.8 | 43.1 | 66.7 | 5.5 | 12.4 | 13.1 |
| 14 | 16.2 | 44.2 | 68.4 | 4.8 | 11.1 | 11.6 |
| 15 | 18.2 | 49.8 | 77.0 | 5.5 | 12.4 | 13.1 |
| 3 | 20.2 | 55.3 | 85.5 | 6.1 | 13.8 | 14.5 |
| 16 | 19.2 | 52.5 | 81.2 | 5.8 | 13.1 | 13.8 |
| 17 | 18.4 | 49.6 | 77.5 | 5.5 | 12.4 | 13.2 |
| 18 | 17.2 | 44.5 | 68.9 | 5.2 | 11.1 | 11.7 |
| 19 | 16.8 | 43.0 | 65.7 | 5.0 | 10.8 | 11.2 |
| 20 | 16.3 | 41.5 | 64.7 | 4.9 | 10.4 | 11.0 |

As shown in Table 11 above, the gypsum in the ultralow-carbon clinker-free cement of Examples 12 to 20 of the disclosure accounted for 4.5%-34.5% of the total weight of the raw materials, and its 1-day, 3-day and 28-day strengths increased first and then decreased with the increase of the content of the gypsum, and was optimal when the content of the gypsum was within the range of 15%-20%. Within this range, the cement had high early strength and ultrahigh long-term strength. This indicated that as long as the content of the gypsum in the raw materials was controlled at a proper level, it could bring desired early strength and long-term strength to the cement.

Application Examples 21 to 25

The ultralow-carbon clinker-free cement of Example 21 to Example 25 and water were mixed in a water-to-binder ratio of 0.4 according to Chapter 7.2 in GB 1346 to prepare a neat paste. The net paste was molded according to Chapter 7 in GB/T 17671, cured to 1 day, 3 days and 28 days according to Chapter 8 in GB/T 17671, and tested for its compressive strength and flexural strength according to Chapter 9 in GB/T 17671. The test results are shown in Table 12:

TABLE 12

| Application Example No. | Compressive strength (MPa) | | | Flexural strength (MPa) | | |
| --- | --- | --- | --- | --- | --- | --- |
| | 1 d | 3 d | 28 d | 1 d | 3 d | 28 d |
| 21 | 17.5 | 40.3 | 80.1 | 5.3 | 10.1 | 13.6 |
| 22 | 18.8 | 48.2 | 85.3 | 5.6 | 12.1 | 14.5 |
| 3 | 20.2 | 55.3 | 85.5 | 6.1 | 13.8 | 14.5 |
| 23 | 22.3 | 56.6 | 85.0 | 6.7 | 14.2 | 14.6 |
| 24 | 23.9 | 57.0 | 84.8 | 7.2 | 14.3 | 14.5 |
| 25 | 25.9 | 56.7 | 80.3 | 7.8 | 14.2 | 14.4 |

As shown in Table 12 above, the ultralow-carbon clinker-free cement of Examples 21 to 25 of the disclosure also had high early strength and ultrahigh long-term strength. This indicated that as long as the content of the free calcium oxide in the raw materials was controlled at a proper level, it could bring desired early strength and long-term strength to the cement. The grinding degree of the raw materials within a certain range could also affect the properties of the cement. Increasing the grinding degree of the raw materials may improve the activity of the raw materials, increase the hydration reaction speed, and significantly improve the early strength of the cement. However, when the fineness was too high, the early reaction speed was too high, resulting in a slight decrease in the long-term strength.

Application Examples 26 to 32

The ultralow-carbon clinker-free cement of Example 26 to Example 32 and water were mixed in a water-to-binder ratio of 0.4 according to Chapter 7.2 in GB 1346 to prepare a neat paste. The net paste was molded according to Chapter 7 in GB/T 17671, cured to 1 day, 3 days and 28 days according to Chapter 8 in GB/T 17671, and tested for its compressive strength and flexural strength according to Chapter 9 in GB/T 17671. The test results are shown in Table 13:

TABLE 13

| Application Example No. | Compressive strength (MPa) | | | Flexural strength (MPa) | | |
| --- | --- | --- | --- | --- | --- | --- |
| | 1 d | 3 d | 28 d | 1 d | 3 d | 28 d |
| 26 | 21.7 | 56.9 | 85.0 | 6.5 | 14.2 | 14.5 |
| 3 | 20.2 | 55.3 | 85.5 | 6.1 | 13.8 | 14.5 |
| 27 | 20.0 | 54.7 | 84.6 | 6.0 | 13.7 | 14.4 |
| 28 | 19.8 | 54.2 | 84.8 | 5.9 | 13.5 | 14.4 |
| 29 | 19.6 | 53.7 | 84.0 | 5.9 | 13.4 | 14.3 |
| 30 | 19.4 | 53.1 | 84.2 | 5.8 | 13.3 | 14.3 |
| 31 | 19.0 | 52.6 | 84.3 | 5.7 | 13.1 | 14.3 |
| 32 | 21.3 | 56.2 | 84.5 | 6.4 | 14.1 | 14.4 |

As shown in Table 13 above, the ultralow-carbon clinker-free cement of Examples 26 to 32 of the disclosure also had high early strength and ultrahigh long-term strength. This indicated that as long as the content of the free calcium oxide in the raw materials was controlled at a proper level, it could bring desired early strength and long-term strength to the cement. The purity and type of the calcium oxide-based material could vary according to the actual situation.

Application Examples 33 to 41

The ultralow-carbon clinker-free cement of Example 33 to Example 41 and water were mixed in a water-to-binder ratio of 0.4 according to Chapter 7.2 in GB 1346 to prepare a neat paste. The net paste was molded according to Chapter 7 in GB/T 17671, cured to 1 day, 3 days and 28 days according to Chapter 8 in GB/T 17671, and tested for its compressive strength and flexural strength according to Chapter 9 in GB/T 17671. The test results are shown in Table 14:

TABLE 14

| Application Example No. | Compressive strength (MPa) | | | Flexural strength (MPa) | | |
| --- | --- | --- | --- | --- | --- | --- |
| | 1 d | 3 d | 28 d | 1 d | 3 d | 28 d |
| 33 | 19.2 | 52.5 | 81.2 | 5.8 | 13.1 | 13.8 |
| 34 | 18.2 | 49.8 | 77.0 | 5.5 | 12.4 | 13.1 |
| 35 | 17.2 | 47.0 | 72.7 | 5.2 | 11.8 | 12.4 |
| 36 | 16.8 | 45.9 | 71.0 | 5.0 | 11.5 | 12.1 |
| 37 | 16.2 | 44.2 | 76.4 | 4.8 | 11.1 | 13.0 |
| 38 | 15.8 | 43.1 | 66.7 | 4.7 | 10.8 | 12.0 |
| 39 | 15.4 | 42.0 | 65.0 | 4.6 | 10.5 | 11.7 |
| 40 | 15.2 | 41.5 | 64.1 | 4.5 | 10.4 | 11.5 |
| 41 | 14.1 | 38.7 | 59.9 | 4.2 | 9.7 | 11.2 |

Application Examples 42 to 49

The ultralow-carbon clinker-free cement of Example 42 to Example 49 and water were mixed in a water-to-binder ratio of 0.4 according to Chapter 7.2 in GB 1346 to prepare a neat paste. The net paste was molded according to Chapter 7 in GB/T 17671, cured to 1 day, 3 days and 28 days according to Chapter 8 in GB/T 17671, and tested for its compressive strength and flexural strength according to Chapter 9 in GB/T 17671. The test results are shown in Table 15:

TABLE 15

| Application Example No. | Compressive strength (MPa) | | | Flexural strength (MPa) | | |
| --- | --- | --- | --- | --- | --- | --- |
| | 1 d | 3 d | 28 d | 1 d | 3 d | 28 d |
| 42 | 20.8 | 56.5 | 83.8 | 6.2 | 13.0 | 14.5 |
| 43 | 21.1 | 56.8 | 80.4 | 6.3 | 12.7 | 14.2 |
| 44 | 21.5 | 57.0 | 77.0 | 6.5 | 12.5 | 14.0 |
| 45 | 22.0 | 57.2 | 75.2 | 6.6 | 12.3 | 13.8 |
| 46 | 22.2 | 58.1 | 71.8 | 6.7 | 12.2 | 13.7 |
| 47 | 21.2 | 57.7 | 71.0 | 6.4 | 12.0 | 13.3 |
| 48 | 20.2 | 56.9 | 70.1 | 6.1 | 11.9 | 12.9 |
| 49 | 18.9 | 55.1 | 67.5 | 5.7 | 11.5 | 12.7 |
| 50 | 17.5 | 53.1 | 61.6 | 5.3 | 10.5 | 12.3 |

Application Examples 51 to 55

The ultralow-carbon clinker-free cement of Example 51 to Example 55 and water were mixed in a water-to-binder ratio of 0.4 according to Chapter 7.2 in GB 1346 to prepare a neat paste. The net paste was molded according to Chapter 7 in GB/T 17671, cured to 1 day, 3 days and 28 days according to Chapter 8 in GB/T 17671, and tested for its compressive strength and flexural strength according to Chapter 9 in GB/T 17671. The test results are shown in Table 16:

TABLE 16

| Application Example No. | Compressive strength (MPa) | | | Flexural strength (MPa) | | |
| --- | --- | --- | --- | --- | --- | --- |
| | 1 d | 3 d | 28 d | 1 d | 3 d | 28 d |
| 51 | 21.6 | 57.1 | 80.1 | 6.5 | 13.6 | 14.3 |
| 52 | 20.3 | 56.6 | 78.2 | 6.1 | 13.3 | 14.2 |
| 53 | 19.3 | 55.1 | 77.2 | 5.8 | 13.1 | 13.8 |

TABLE 16-continued

| Application Example No. | Compressive strength (MPa) | | | Flexural strength (MPa) | | |
|---|---|---|---|---|---|---|
| | 1 d | 3 d | 28 d | 1 d | 3 d | 28 d |
| 54 | 19 | 50 | 76.8 | 5.7 | 12.5 | 13.1 |
| 55 | 18.6 | 46.9 | 75.1 | 5.6 | 11.7 | 12.8 |

As shown in Tables 13 to 16 above, the ultralow-carbon clinker-free cement of Examples 26 to 54 of the disclosure also had high early strength and ultrahigh long-term strength. This indicated that as long as the content of the free calcium oxide in the raw materials was controlled at a proper level, it could bring desired early strength and long-term strength to the cement. A certain amount of cement additives could also be added to the raw materials to further reduce the carbon emissions of the cement of the disclosure.

Application Examples 56 to 76

The ultralow-carbon clinker-free cement of Examples 56 to 76 and water were mixed in a water-to-binder ratio of 0.4 according to Chapter 7.2 in GB 1346 to prepare a neat paste. The net paste was molded according to Chapter 7 in GB/T 17671, cured to 1 day, 3 days and 28 days according to Chapter 8 in GB/T 17671, and tested for its compressive strength and flexural strength according to Chapter 9 in GB/T 17671. The test results are shown in Table 17:

TABLE 17

| Application Example No. | Compressive strength (MPa) | | | Flexural strength (MPa) | | |
|---|---|---|---|---|---|---|
| | 1 d | 3 d | 28 d | 1 d | 3 d | 28 d |
| 56 | 30.20 | 56.20 | 85.30 | 9.06 | 14.05 | 14.50 |
| 57 | 29.10 | 58.30 | 85.00 | 8.73 | 14.58 | 14.45 |
| 58 | 26.10 | 60.60 | 84.70 | 10.50 | 17.97 | 18.90 |
| 59 | 31.20 | 60.10 | 80.20 | 9.36 | 15.03 | 13.63 |
| 60 | 28.70 | 53.33 | 80.47 | 8.61 | 13.33 | 13.68 |
| 61 | 25.10 | 51.51 | 79.62 | 7.53 | 12.88 | 13.54 |
| 62 | 28.90 | 50.30 | 76.30 | 8.67 | 12.57 | 12.97 |
| 63 | 20.10 | 57.40 | 91.60 | 6.03 | 14.35 | 15.11 |
| 64 | 19.90 | 58.10 | 92.30 | 5.97 | 14.53 | 15.23 |
| 65 | 20.50 | 59.60 | 93.20 | 6.15 | 14.90 | 15.38 |
| 66 | 31.70 | 59.00 | 80.60 | 9.51 | 14.75 | 14.70 |
| 67 | 30.50 | 58.29 | 81.20 | 10.20 | 17.70 | 19.19 |
| 68 | 32.10 | 58.90 | 83.88 | 9.63 | 13.80 | 14.26 |
| 69 | 31.60 | 60.70 | 79.50 | 9.48 | 13.10 | 14.20 |
| 70 | 31.20 | 62.10 | 92.50 | 9.20 | 14.10 | 14.70 |
| 71 | 20.10 | 56.40 | 94.30 | 7.50 | 14.50 | 15.00 |
| 72 | 34.60 | 60.10 | 87.10 | 9.15 | 18.66 | 19.98 |
| 73 | 32.10 | 59.20 | 85.10 | 8.70 | 14.20 | 15.20 |
| 74 | 33.40 | 58.60 | 92.00 | 8.90 | 13.70 | 15.00 |
| 75 | 20.10 | 60.10 | 91.90 | 6.60 | 13.50 | 15.80 |
| 76 | 27.90 | 54.00 | 91.00 | 7.80 | 13.20 | 15.10 |

Application Examples 77 to 80

The ultralow-carbon clinker-free cement of Examples 77 to 80 and water were mixed in a water-to-binder ratio of 0.4 according to Chapter 7.2 in GB 1346 to prepare a neat paste. The net paste was molded according to Chapter 7 in GB/T 17671, cured to 1 day, 3 days and 28 days according to Chapter 8 in GB/T 17671, and tested for its compressive strength and flexural strength according to Chapter 9 in GB/T 17671. The test results are shown in Table 18:

TABLE 18

| Application Example No. | Compressive strength (MPa) | | | Flexural strength (MPa) | | |
|---|---|---|---|---|---|---|
| | 1 d | 3 d | 28 d | 1 d | 3 d | 28 d |
| 77 | 18.2 | 50.2 | 74.4 | 5.4 | 11.6 | 12.6 |
| 78 | 18.8 | 55.2 | 82.0 | 7.1 | 15.1 | 16.4 |
| 79 | 21.5 | 52.1 | 80.1 | 6.5 | 13.0 | 13.6 |
| 80 | 22.1 | 54.2 | 83.1 | 7.2 | 15.0 | 16.8 |

As shown in Tables 17 to 18 above, the ultralow-carbon clinker-free cement of Examples 56 to 80 of the disclosure also had high early strength and ultrahigh long-term strength. This indicated that as long as the content of the free calcium oxide in the raw materials was controlled at a proper level, it could bring desired early strength and long-term strength to the cement. A certain amount of cement additives could also be added to the raw materials to further reduce the carbon emissions of the cement of the disclosure, and a certain amount of set controlling and accelerating component could also be added to the raw materials to further increase the early strength of the cement.

In the process of proposing the disclosure, the inventors not only obtained the desired ultralow-carbon clinker-free cement through the experiments of the above examples, but also verified the degradation of the properties of the cement caused by raw materials in other mix proportions through a larger number of experiments. Only representative comparative examples are selected below for illustration:

Comparative Example 1

An ultralow-carbon clinker-free cement, as shown in Table 19 below, was prepared from the following raw materials in weight percentage: 80% of granulated blast-furnace slag and 20% of natural dihydrate gypsum.

A method for preparing the ultralow-carbon clinker-free cement included: all the raw materials were proportionally mixed, ground to a specific surface area of 500 m²/kg, and mixed uniformly, thereby obtaining the ultralow-carbon clinker-free cement.

TABLE 19

| Comparative Example No. | Mix proportion of raw material (%) | | | Specific surface area after grinding (m²/kg) | Weight percentage of free calcium oxide in raw materials (%) |
|---|---|---|---|---|---|
| | Granulated blast-furnace slag | Natural dihydrate gypsum | Quicklime | | |
| 1 | 80 | 20 | 0 | 500 | 0 |

Comparative Example 2

An ultralow-carbon clinker-free cement, as shown in Table 20 below, was prepared from the following raw materials in weight percentage: 77.50% of granulated blast-furnace slag, 20% of natural dihydrate gypsum and 2.5% of quicklime. A content of CaO in the quicklime was 80%.

A method for preparing the ultralow-carbon clinker-free cement included: all the raw materials were proportionally mixed, ground to a specific surface area of 500 m²/kg, and mixed uniformly, thereby obtaining the ultralow-carbon clinker-free cement. A weight percentage of free calcium oxide was controlled to be 2%.

TABLE 20

| Comparative Example No. | Mix proportion of raw material (%) | | | Specific surface area after grinding (m²/kg) | Weight percentage of free calcium oxide in raw materials (%) |
|---|---|---|---|---|---|
| | Granulated blast-furnace slag | Natural dihydrate gypsum | Quicklime | | |
| 2 | 77.50 | 20 | 2.50 | 500 | 2 |

Comparative Example 3

An ultralow-carbon clinker-free cement, as shown in Table 21 below, was prepared from the following raw materials in weight percentage: 59.80% of granulated blast-furnace slag, 40% of natural dihydrate gypsum and 0.2% of quicklime. A content of CaO in the quicklime was 80%.

A method for preparing the ultralow-carbon clinker-free cement included: all the raw materials were proportionally mixed, ground to a specific surface area of 500 m²/kg, and mixed uniformly, thereby obtaining the ultralow-carbon clinker-free cement. A weight percentage of free calcium oxide was controlled to be 0.16%.

TABLE 21

| Comparative Example No. | Mix proportion of raw material (%) | | | Specific surface area after grinding (m²/kg) | Weight percentage of free calcium oxide in raw materials (%) |
|---|---|---|---|---|---|
| | Granulated blast-furnace slag | Natural dihydrate gypsum | Quicklime | | |
| 3 | 59.80 | 40.00 | 0.20 | 500 | 0.16 |

Comparative Example 4

An ultralow-carbon clinker-free cement, as shown in Table 22 below, was prepared from the following raw materials in weight percentage: 96.80% of granulated blast-furnace slag, 3% of natural dihydrate gypsum and 0.2% of quicklime. A content of CaO in the quicklime was 80%.

A method for preparing the ultralow-carbon clinker-free cement included: all the raw materials were proportionally mixed, ground to a specific surface area of 500 m²/kg, and mixed uniformly, thereby obtaining the ultralow-carbon clinker-free cement. A weight percentage of free calcium oxide was controlled to be 0.16%.

TABLE 22

| Comparative Example No. | Mix proportion of raw material (%) | | | Specific surface area after grinding (m²/kg) | Weight percentage of free calcium oxide in raw materials (%) |
|---|---|---|---|---|---|
| | Granulated blast-furnace slag | Natural dihydrate gypsum | Quicklime | | |
| 4 | 96.80 | 3 | 0.20 | 500 | 0.16 |

Comparative Example 5

An ultralow-carbon clinker-free cement, as shown in Table 23 below, was prepared from the following raw materials in weight percentage: 79.80% of granulated blast-furnace slag, 20% of natural dihydrate gypsum and 0.2% of quicklime. A content of CaO in the quicklime was 80%.

A method for preparing the ultralow-carbon clinker-free cement included: all the raw materials were proportionally mixed, ground to a specific surface area of 100 m²/kg, and mixed uniformly, thereby obtaining the ultralow-carbon clinker-free cement. A weight percentage of free calcium oxide was controlled to be 0.16%.

TABLE 23

| Comparative Example No. | Mix proportion of raw material (%) | | | Specific surface area after grinding (m²/kg) | Weight percentage of free calcium oxide in raw materials (%) |
|---|---|---|---|---|---|
| | Granulated blast-furnace slag | Natural dihydrate gypsum | Quicklime | | |
| 6 | 79.80 | 20 | 0.20 | 1400 | 0.16 |

Comparative Example 6

An ultralow-carbon clinker-free cement, as shown in Table 24 below, was prepared from the following raw materials in weight percentage: 79.80% of granulated blast-furnace slag, 20% of natural dihydrate gypsum and 0.2% of quicklime. A content of CaO in the quicklime was 80%.

A method for preparing the ultralow-carbon clinker-free cement included: all the raw materials were proportionally mixed, ground to a specific surface area of 1400 m²/kg, and mixed uniformly, thereby obtaining the ultralow-carbon clinker-free cement. A weight percentage of free calcium oxide was controlled to be 0.16%.

TABLE 24

| Comparative Example No. | Mix proportion of raw material (%) | | | Specific surface area after grinding (m²/kg) | Weight percentage of free calcium oxide in raw materials (%) |
|---|---|---|---|---|---|
| | Granulated blast-furnace slag | Natural dihydrate gypsum | Quicklime | | |
| 5 | 79.80 | 20 | 0.20 | 100 | 0.16 |

Comparative Example 7

An ultralow-carbon clinker-free cement, as shown in Table 25 below, was prepared from the following raw materials in weight percentage: 39.80% of granulated blast-furnace slag, 20% of natural dihydrate gypsum, 40% of fly ash and 0.2% of quicklime. A content of CaO in the quicklime was 80%.

A method for preparing the ultralow-carbon clinker-free cement included: all the raw materials were proportionally mixed, ground to a specific surface area of 500 m²/kg, and mixed uniformly, thereby obtaining the ultralow-carbon clinker-free cement. A weight percentage of free calcium oxide was controlled to be 0.16%.

TABLE 25

| Comparative Example No. | Mix proportion of raw material (%) | | | | | Specific surface area after grinding (m²/kg) | Weight percentage of free calcium oxide in raw materials (%) |
|---|---|---|---|---|---|---|---|
| | Granulated blast-furnace slag | Natural dihydrate gypsum | Cement additives | | | | |
| | | | Fly ash | Limestone powder | Quicklime | | |
| 7 | 39.80 | 20 | 40 | 0 | 0.2 | 500 | 0.16 |

Comparative Example 8

An ultralow-carbon clinker-free cement, as shown in Table 26 below, was prepared from the following raw materials in weight percentage: 76.80% of granulated blast-furnace slag, 20% of natural dihydrate gypsum, 3% of Sodium hydroxide and 0.2% of quicklime. A content of CaO in the quicklime was 80%.

A method for preparing the ultralow-carbon clinker-free cement included: all the raw materials were proportionally mixed, ground to a specific surface area of 500 m²/kg, and mixed uniformly, thereby obtaining the ultralow-carbon clinker-free cement. A weight percentage of free calcium oxide was controlled to be 0.16%.

TABLE 26

| Comparative Example No. | Mix proportion of raw material (%) | | | | Specific surface area after grinding (m²/kg) | Weight percentage of free calcium oxide in raw materials (%) |
|---|---|---|---|---|---|---|
| | Granulated blast-furnace slag | Natural dihydrate gypsum | Set controlling and accelerating component | | | |
| | | | Sodium hydroxide | Quicklime | | |
| 8 | 76.80 | 20 | 3 | 0.2 | 500 | 0.16 |

Application Comparative Example 1

The ultralow-carbon clinker-free cement of Comparative Example 1 and water were mixed in a water-to-binder ratio of 0.4 according to Chapter 7.2 in GB 1346 to prepare a neat paste. The net paste was molded according to Chapter 7 in GB/T 17671, cured to 1 day, 3 days and 28 days according to Chapter 8 in GB/T 17671, and tested for its compressive strength and flexural strength according to Chapter 9 in GB/T 17671. The test results are shown in Table 28:

TABLE 28

| Application Comparative Example No. | Compressive strength (MPa) | | | Flexural strength (MPa) | | |
|---|---|---|---|---|---|---|
| | 1 d | 3 d | 28 d | 1 d | 3 d | 28 d |
| 1 | 0.0 | 5.6 | 11.7 | 0.0 | 1.4 | 2.0 |

In the ultralow-carbon clinker-free cement in this application comparative example, due to the lack of the calcium oxide alkaline activator in the raw materials, the granulated blast-furnace slag was not activated, and the cement had almost no strength at the stage and extremely poor long-term strength.

Application Comparative Example 2

The ultralow-carbon clinker-free cement of Comparative Example 2 and water were mixed in a water-to-binder ratio of 0.4 according to Chapter 7.2 in GB 1346 to prepare a neat paste. The net paste was molded according to Chapter 7 in GB/T 17671, cured to 1 day, 3 days and 28 days according to Chapter 8 in GB/T 17671, and tested for its compressive strength and flexural strength according to Chapter 9 in GB/T 17671. The test results are shown in Table 29:

TABLE 29

| Application Comparative Example No. | Compressive strength (MPa) | | | Flexural strength (MPa) | | |
|---|---|---|---|---|---|---|
| | 1 d | 3 d | 28 d | 1 d | 3 d | 28 d |
| 2 | 14.1 | 33.2 | 34.2 | 4.2 | 8.3 | 8.0 |

In this application comparative example, the ultralow-carbon clinker-free cement of Comparative Example 2 was used. The addition of excessive quicklime to the raw materials made too much calcium oxide involved in the hydration reaction. On the one hand, the excessive calcium oxide caused too much alkali in the pore solution, which hindered the formation of ettringite, resulting in the reduction of ettringite production and strength of the system (by comparing DTA curves of hydration products in the hardened cements of Application Example 1 and this application comparative example of the disclosure after curing for 28 days, the inventors found that the peak height of ettringite in this application comparative example was obviously lower than that in Application Example 1, indicating that the ettringite production in this application comparative example was obviously less than that in Application Example 1; the comparison of the DTA curves of the hydration products is shown in FIG. 1). On the other hand, the excessive free calcium oxide may react with the alumina gel and the ettringite to generate monosulfate type calcium sulfoaluminate hydrate that was low in strength, easily carbonated and less resistant to corrosion. Moreover, this reaction may cause a reduction in the volume of the product, resulting in a loose hardened body with increased porosity. This reaction may also consume the alumina gel capable of gelling, resulting in an insufficient amount of colloidal in the system to bond other substances. Thus, the strength of the cement was significantly reduced, and the generated monosulfate type calcium sulfoaluminate hydrate was easily carbonated, making the cement easily carbonated and corroded. The finally obtained cement was significantly improved as compared with the cement of Application Comparative Example 1, but had worse early strength and long-term strength as compared with the cement of the application examples of the disclosure.

Application Comparative Example 3

The ultralow-carbon clinker-free cement of Comparative Example 3 and water were mixed in a water-to-binder ratio of 0.4 according to Chapter 7.2 in GB 1346 to prepare a neat paste. The net paste was molded according to Chapter 7 in GB/T 17671, cured to 1 day, 3 days and 28 days according to Chapter 8 in GB/T 17671, and tested for its compressive strength and flexural strength according to Chapter 9 in GB/T 17671. The test results are shown in Table 30:

TABLE 30

| Application Comparative | Compressive strength (MPa) | | | Flexural strength (MPa) | | |
|---|---|---|---|---|---|---|
| Example No. | 1 d | 3 d | 28 d | 1 d | 3 d | 28 d |
| 3 | 8.2 | 25.3 | 36.1 | 2.5 | 6.3 | 6.1 |

In this application comparative example, the amount of the granulated blast-furnace slag added to the ultralow-carbon clinker-free cement was too low, and relatively, the amount of the gypsum added was too high, which led to the surplus of gypsum exhibiting large-size rod-shaped crystals in the system, resulting in the looseness or even cracking of the system. Therefore, the obtained cement could not gain desired early strength and long-term strength.

Application Comparative Example 4

The ultralow-carbon clinker-free cement of Comparative Example 4 and water were mixed in a water-to-binder ratio of 0.4 according to Chapter 7.2 in GB 1346 to prepare a neat paste. The net paste was molded according to Chapter 7 in GB/T 17671, cured to 1 day, 3 days and 28 days according to Chapter 8 in GB/T 17671, and tested for its compressive strength and flexural strength according to Chapter 9 in GB/T 17671. The test results are shown in Table 31:

TABLE 31

| Application Comparative | Compressive strength (MPa) | | | Flexural strength (MPa) | | |
|---|---|---|---|---|---|---|
| Example No. | 1 d | 3 d | 28 d | 1 d | 3 d | 28 d |
| 4 | 8.1 | 22.1 | 34.2 | 2.4 | 5.5 | 5.8 |

In this application comparative example, the amount of the granulated blast-furnace slag added to the ultralow-carbon clinker-free cement was too high, and the amount of the gypsum raw material added was too low, which led to the reduction in reactants required for producing ettringite, resulting in the reduction in the main hydration product, i.e., ettringite. Therefore, the obtained cement could not gain desired early strength and long-term strength.

Application Comparative Example 5

The ultralow-carbon clinker-free cement of Comparative Example 5 and water were mixed in a water-to-binder ratio of 0.4 according to Chapter 7.2 in GB 1346 to prepare a neat paste. The net paste was molded according to Chapter 7 in GB/T 17671, cured to 1 day, 3 days and 28 days according to Chapter 8 in GB/T 17671, and tested for its compressive strength and flexural strength according to Chapter 9 in GB/T 17671. The test results are shown in Table 32:

TABLE 32

| Application Comparative | Compressive strength (MPa) | | | Flexural strength (MPa) | | |
|---|---|---|---|---|---|---|
| Example No. | 1 d | 3 d | 28 d | 1 d | 3 d | 28 d |
| 5 | 2.5 | 35.0 | 75.8 | 0.8 | 8.8 | 12.9 |

In this application comparative example, the raw materials of the ultralow-carbon clinker-free cement were not ground sufficiently, making it difficult for the gypsum and the quicklime to quickly break the vitreous structure of the slag and activate the slag. Therefore, the obtained cement could not gain desired early strength and long-term strength.

Application Comparative Example 6

The ultralow-carbon clinker-free cement of Comparative Example 6 and water were mixed in a water-to-binder ratio of 0.4 according to Chapter 7.2 in GB 1346 to prepare a neat paste. The net paste was molded according to Chapter 7 in GB/T 17671, cured to 1 day, 3 days and 28 days according to Chapter 8 in GB/T 17671, and tested for its compressive strength and flexural strength according to Chapter 9 in GB/T 17671. The test results are shown in Table 33:

TABLE 33

| Application Comparative | Compressive strength (MPa) | | | Flexural strength (MPa) | | |
|---|---|---|---|---|---|---|
| Example No. | 1 d | 3 d | 28 d | 1 d | 3 d | 28 d |
| 6 | 20.6 | 50.1 | 70.6 | 6.2 | 13.5 | 13.5 |

In this application comparative example, the raw materials of the ultralow-carbon clinker-free cement was ground excessively, which made the treatment cost high and the production of the hydration product such as ettringite too fast, resulting in more pores and lower compactness inside the hardened cement. Therefore, the obtained cement could not gain desired early strength and long-term strength.

Application Comparative Example 7

The ultralow-carbon clinker-free cement of Comparative Example 7 and water were mixed in a water-to-binder ratio of 0.4 according to Chapter 7.2 in GB 1346 to prepare a neat paste. The net paste was molded according to Chapter 7 in GB/T 17671, cured to 1 day, 3 days and 28 days according to Chapter 8 in GB/T 17671, and tested for its compressive strength and flexural strength according to Chapter 9 in GB/T 17671. The test results are shown in Table 34:

TABLE 34

| Application Comparative | Compressive strength (MPa) | | | Flexural strength (MPa) | | |
|---|---|---|---|---|---|---|
| Example No. | 1 d | 3 d | 28 d | 1 d | 3 d | 28 d |
| 7 | 9.1 | 25.1 | 35.2 | 2.7 | 6.3 | 6.0 |

In this application comparative example, the amount of the fly ash with low activity in the raw materials of the ultralow-carbon clinker-free cement was too high, and the content of the slag with higher activity was relatively low. Therefore, the obtained cement could not gain desired early strength and long-term strength.

Application Comparative Example 8

The ultralow-carbon clinker-free cement of Comparative Example 8 and water were mixed in a water-to-binder ratio of 0.4 according to Chapter 7.2 in GB 1346 to prepare a neat paste. The net paste was molded according to Chapter 7 in GB/T 17671, cured to 1 day, 3 days and 28 days according to Chapter 8 in GB/T 17671, and tested for its compressive strength and flexural strength according to Chapter 9 in GB/T 17671. The test results are shown in Table 35:

TABLE 35

| Application Comparative | Compressive strength (MPa) | | | Flexural strength (MPa) | | |
|---|---|---|---|---|---|---|
| Example No. | 1 d | 3 d | 28 d | 1 d | 3 d | 28 d |
| 8 | 14.80 | 43.20 | 37.94 | 4.50 | 9.80 | 8.20 |

In this application comparative example, the amount of the set controlling and accelerating component sodium hydroxide added in the raw materials of the ultralow-carbon clinker-free cement was too high, which caused a high preparation cost and too much alkali in the system due to the excessive sodium hydroxide, hindering the formation of the main hydration product, i.e., ettringite. Therefore, the obtained cement could not gain desired early strength and long-term strength.

The invention claimed is:

1. An ultralow-carbon clinker-free cement, prepared from the following raw materials in weight percentage:
   79.47%-79.82% of granulated blast-furnace slag,
   20% of gypsum and the balance of calcium oxide-based material; wherein
   a weight percentage of free calcium oxide in the total weight of the raw materials is 0.16%; and
   a specific surface area of the raw materials is 500 m$^2$/kg; and
   the free calcium oxide is the component in the raw materials that are not combined with acidic oxides and exist in the form of free calcium oxide and/or calcium hydroxide.

2. An ultralow-carbon clinker-free cement, prepared from the following raw materials:
   granulated blast-furnace slag, gypsum, cement additives and a calcium oxide-based material; wherein
   the granulated blast-furnace slag accounts for 33%-94% of the total weight of the raw materials,
   the gypsum accounts for 19.5%-20% of the total weight of the raw materials,
   the cement additives accounts for 0.65%-32% of the total weight of the raw materials, and
   the balance is the calcium oxide-based material; and
   a weight percentage of free calcium oxide in the total weight of the raw materials is controlled to be 0.10%-0.5%; and
   the free calcium oxide is the component in the raw materials that are not combined with acidic oxides and exist in the form of free calcium oxide and calcium hydroxide.

3. The ultralow-carbon clinker-free cement according to claim 2, wherein the granulated blast-furnace slag accounts for 35%-90% of the total weight of the raw materials.

4. The ultralow-carbon clinker-free cement according to claim 2, wherein the granulated blast-furnace slag accounts for 47%-80% of the total weight of the raw materials.

5. The ultralow-carbon clinker-free cement according to claim 2, wherein the granulated blast-furnace slag accounts for 54%-80% of the total weight of the raw materials.

6. The ultralow-carbon clinker-free cement according to claim 2, wherein the cement additives accounts for 0.65%-25% of the total weight of the raw materials.

7. The ultralow-carbon clinker-free cement according to claim 2, wherein the cement additives accounts for 0.65%-5% of the total weight of the raw materials.

8. The ultralow-carbon clinker-free cement according to claim 2, wherein the cement additives accounts for 10%-20% of the total weight of the raw materials.

9. The ultralow-carbon clinker-free cement according to claim 2, wherein the weight percentage of the free calcium oxide in the total weight of the raw materials is controlled to be 0.16%-0.2%.

10. An ultralow-carbon clinker-free cement, prepared from the following raw materials in weight percentage: 54%-78% of granulated blast-furnace slag, 20% of gypsum, 0.65%-5% of cement additives and the balance of calcium oxide-based material; wherein a weight percentage of free calcium oxide in the total weight of the raw materials is controlled to be 0.15%-0.16%; and a specific surface area of the raw materials is 500 m$^2$/kg; and the free calcium oxide is the component in the raw materials that are not combined with acidic oxides and exist in the form of free calcium oxide and/or calcium hydroxide.

11. An ultralow-carbon clinker-free cement, prepared from the following raw materials in weight percentage: 54%-68% of granulated blast-furnace slag, 20% of gypsum, 10%-20% of cement additives and the balance of calcium oxide-based material; wherein a weight percentage of free calcium oxide in the total weight of the raw materials is controlled to be 0.15%-0.16%; and a specific surface area of the raw materials is 500 m$^2$/kg; and the free calcium oxide is the component in the raw materials that are not combined with acidic oxides and exist in the form of free calcium oxide and/or calcium hydroxide.

12. An ultralow-carbon clinker-free cement, prepared from the following raw materials: granulated blast-furnace slag, gypsum, a set controlling and accelerating component and a calcium oxide-based material; wherein the granulated blast-furnace slag accounts for 63%-94% of the total weight of the raw materials, the gypsum accounts for 20% of the total weight of the raw materials, the set controlling and accelerating component accounts for 0.9%-1.95% of the total weight of the raw materials, and the balance is the calcium oxide-based material; and a weight percentage of free calcium oxide in the total weight of the raw materials is controlled to be 0.10%-0.5%; and the free calcium oxide is the component in the raw materials that are not combined with acidic oxides and exist in the form of free calcium oxide and calcium hydroxide.

13. The ultralow-carbon clinker-free cement according to claim 12, wherein the granulated blast-furnace slag accounts for 65%-90% of the total weight of the raw materials.

14. The ultralow-carbon clinker-free cement according to claim 12, wherein the granulated blast-furnace slag accounts for 77.5%-79% of the total weight of the raw materials.

15. The ultralow-carbon clinker-free cement according to claim 12, wherein the set controlling and accelerating component accounts for 1%-1.5% of the total weight of the raw materials.

16. The ultralow-carbon clinker-free cement according to claim 12, wherein the weight percentage of the free calcium oxide in the total weight of the raw materials is controlled to be 0.16%-0.2%.

17. An ultralow-carbon clinker-free cement, prepared from the following raw materials: granulated blast-furnace slag, gypsum, cement additives, a set controlling and accelerating component and a calcium oxide-based material; wherein the granulated blast-furnace slag accounts for 60%-61% of the total weight of the raw materials, the gypsum accounts for 19.5%-20% of the total weight of the raw materials, the cement additives accounts for 15%-18% of the total weight of the raw materials, and the set controlling and accelerating component accounts for 0.9%1.95%1%-1.2% of the total weight of the raw materials; and a weight percentage of free calcium oxide in the total weight of the raw materials is controlled to be 0.10%-0.5%; and the free calcium oxide is the component in the raw materials that are not combined with acidic oxides and exist in the form of free calcium oxide and calcium hydroxide.

18. The ultralow-carbon clinker-free cement according to claim 17, wherein the weight percentage of the free calcium oxide in the total weight of the raw materials is controlled to be 0.16%-0.2%.

* * * * *